United States Patent
Kelly et al.

(10) Patent No.: US 9,163,496 B1
(45) Date of Patent: Oct. 20, 2015

(54) METHOD OF MAKING A FRACTURING FLUID COMPOSITION AND UTILIZATION THEREOF

(71) Applicants: Richard M. Kelly, East Amherst, NY (US); Walter L. Renz, Brookfield, CT (US)

(72) Inventors: Richard M. Kelly, East Amherst, NY (US); Walter L. Renz, Brookfield, CT (US)

(73) Assignee: PRAXAIR TECHNOLOGY, INC.

( * ) Notice: Subject to any disclaimer, the term of this patent is extended or adjusted under 35 U.S.C. 154(b) by 0 days.

(21) Appl. No.: 14/313,572

(22) Filed: Jun. 24, 2014

(51) Int. Cl.
*E21B 43/26* (2006.01)
*C09K 8/68* (2006.01)
*C09K 8/80* (2006.01)

(52) U.S. Cl.
CPC .............. *E21B 43/261* (2013.01); *C09K 8/68* (2013.01); *C09K 8/80* (2013.01); *C09K 2208/28* (2013.01)

(58) Field of Classification Search
CPC ........ E21B 43/26; E21B 43/267; E21B 34/14
USPC ........................................... 166/308.1, 308.2
See application file for complete search history.

(56) References Cited

U.S. PATENT DOCUMENTS

| | | | |
|---|---|---|---|
| 3,193,014 A | * | 7/1965 | Hill .................................. 166/57 |
| 4,573,488 A | | 3/1986 | Carville et al. |
| 4,701,270 A | | 10/1987 | Bullen et al. |
| 4,913,235 A | | 4/1990 | Harris et al. |
| 5,045,220 A | * | 9/1991 | Harris et al. .................. 507/221 |
| 6,013,682 A | | 1/2000 | Dalle et al. |
| 7,726,404 B2 | | 6/2010 | Kubala et al. |
| 8,550,165 B2 | | 10/2013 | Gupta et al. |

OTHER PUBLICATIONS

Liaw et al. "Effects of Molecular Chracteristics of Polymers on Drag Reduction", AIChE Journal, vol. 17, Issue 2 (Mar. 1971) pp. 391-397.
Huang et al. "Enhancement of the Viscosity of Carbon Dioxide Using Styrene/Fluoroacrylate Copolymers" Macromolecules (2000) 33, pp. 5437-5442.

* cited by examiner

*Primary Examiner* — Catherine Loikith
*Assistant Examiner* — Silvana Runyan
(74) *Attorney, Agent, or Firm* — lurie A. Schwartz

(57) ABSTRACT

The present disclosure is directed to a method of making a fracturing fluid and system of fracturing a formation penetrated by a well-bore. The method includes providing a fracturing fluid that is liquefied carbon dioxide ($LCO_2$) and a co-solvent in a quantity of 1-19 wt %, and at least one friction-reducing polymer in a quantity of 0.001-1.0 wt % of the fracturing fluid composition, wherein the friction-reducing polymer is initially disposed in an emulsion, and is at least partially soluble in the co-solvent and $LCO_2$ mixture.

18 Claims, 2 Drawing Sheets

METHOD OF MAKING A FRACTURING FLUID COMPOSITION AND UTILIZATION THEREOF

FIELD OF THE INVENTION

The present disclosure relates to a method of making a fracturing fluid composition and utilizing same for fracturing a formation wherein the fracturing fluid includes liquid carbon dioxide, a friction reducing polymer that is a polysiloxane and a co-solvent, wherein the friction reducing polymer is initially disposed as an emulsion, and is at least partially soluble in the liquid carbon dioxide and co-solvent mixture.

BACKGROUND AND RELATED ART

Hydraulic fracturing is a common stimulation technique used to enhance production of oil and gas from hydrocarbon containing reservoirs. In a typical hydraulic fracturing operation, fracturing fluid is pumped at high pressures and high rates through a wellbore penetrating a subterranean formation to initiate and propagate hydraulic fractures in the formation. Subsequent steps typically include adding particulate matter known as proppant to the fracturing fluid (e.g., graded sand, ceramic particles, bauxite, or resin coated sand) which is carried by the fracturing fluid into the fractures. The proppant deposits into the fractures, forming a permeable "proppant pack". Once the fracture treatment is completed, the fracture closes onto the proppant pack allowing for maintenance of the fracture, thereby providing a pathway for hydrocarbons in the formation to flow more easily into the wellbore for recovery.

The use of carbon dioxide ($CO_2$) for production of oil and gas from hydrocarbon containing reservoirs is well known. Utilization of liquid carbon dioxide ($LCO_2$) for the fracture treatment of oil and gas formations has certain advantages in water-sensitive and low pressure formations. In particular, $LCO_2$ enables a significant reduction in the volume of water utilized, and promotes flow-back of water from the formation after fracture treatment. When exposed to aqueous based fluids, formations can trap water for long periods of time, which can result in reduced permeability to hydrocarbons and reduced productivity of the well. Additionally, some clays in the formation can swell in the presence of water or migrate through the formation resulting in closing off or blocking of porosity, again resulting in productivity impairment. Therefore, a reduction in the amount of water introduced into a well can result in decreased formation damage. Moreover, the availability of water for hydraulic fracturing may also be limited in certain geographies of interest for oil and gas production, thereby presenting an economic or regulatory barrier to practical recovery of these resources.

As mentioned above, the fracturing fluid is pumped at high pressures and rates. The pressure generated by the fracturing pumps is known as the "surface treating pressure" and is largely a function of the stress required to create the fracture in the formation, the fracturing fluid frictional pressure losses between the pumps and the formation, and the change in hydrostatic head. The surface treating pressure can be as high as 10,000 psig or more depending on the specific well requirements and pressure capability. The required fracture fluid flow rate is largely a function of the flow required to propagate the fracture and fluid leak-off into the formation. In addition, the flow rate must be sufficient to carry the proppant material (having a tendency to settle out at low flow rates), and is typically in the range 10 to 120 bpm (barrels per minute) depending on the needs of the particular well and fracture design. Well bores commonly can extend from a few thousand feet in shallow vertical wells, to ten or twenty thousand feet or more in long-reach horizontal wells. Common well-bore casing sizes are 4½ inch and 5½ inch, through which the fracturing fluid is pumped. Tubing can also be employed, having a common nominal diameters of 2⅜ inches or 2⅞ inches, inserted through the well casing to carry the fracture fluid. This is performed, for example, when the casing is not strong enough to hold the required fluid pressure. In some cases, fluid may also be carried in the annulus between the casing and tubing.

As can be appreciated there are often scenarios where extremely high frictional pressure drops would be incurred due to high flow rates, small casing or tubing diameters, long well bores, or combinations of these factors. To counteract high pressure drops experienced in conventional fracturing fluids, friction reducers (also commonly referred to as drag reducers) are used. These friction reducers are usually high molecular weight polymers, which are directly added and dissolved in the aqueous fracturing fluid, and have been shown to reduce frictional pressure losses by up to about 70%.

The use of "slickwater" fracturing fluids, which employ a friction reducer in a water carrier fluid is well known in the industry. A common friction reducer used in slickwater is a high molecular weight (typically in the range 5,000,000 to 20,000,000 g/mol) polyacrylamide normally supplied as an inverse or water-in-oil emulsion. Concentrations of friction reducer emulsions employed in slickwater typically range from about 0.25 gpt (gallons per thousand) to 2 gpt. A key consideration in the design of a friction reducer system is the need to quickly dissolve the friction reducer in the fracturing fluid thereby allowing the friction reducer to become effective as soon as possible, as it is usually only a matter of seconds from the time that the friction reducer is added to when the fracturing fluid first enters the well-bore. A hydration unit is typically also used in slickwater systems to hydrate polyacrylamide polymer prior to addition to the slickwater stream.

Limited work has been published on the use of high molecular weight polymers as friction reducers for $CO_2$. U.S. Pat. No. 8,550,165 to Gupta et al. discloses the use of polychloroprenes, vinyl acetate polymers, polyalkylene oxides and polyalphaolefins as friction reducers in a non-aqueous carrier fluid, which may further include $CO_2$. U.S. Pat. No. 4,573,488 A to Carville et al discloses the use of a homopolymer or copolymer of butylene oxide for friction reduction in non-aqueous carrier fluids. U.S. Pat. No. 5,045,220 discloses the use of a polysiloxane and co-solvent for the purposes of thickening $CO_2$, however, this patent states that the polymers used more usually have a molecular weight from 2,000 to 400,000 and that suitable polysiloxanes have a kinematic viscosity of 20,000 centi-Stokes (cSt) to 8,000,000 cSt at 77° F. Applicants co-pending application U.S. Ser. No. 14/136,767, the contents of which are incorporated by reference in its entirety, discloses a fracturing fluid composition that includes a polysiloxane polymer solution, a co-solvent and liquid carbon dioxide.

The present invention provides for the use of polysiloxanes with a weight average molecular weight of 500,000 g/mol or more and a kinematic viscosity greater than 10,000,000 cSt, at 77° F., in combination with a co-solvent, in order to reduce friction in $LCO_2$, wherein the polysiloxane is initially disposed as an emulsion. U.S. Pat. No. 6,013,682 to Dalle et al., describes a method of making silicone in water emulsions that may be used as a feedstock of the present invention. It has been found that by employing the method of making the fracturing fluid with the composition of the present invention, one or more of the following objectives can be realized:

$CO_2$ based fracture treatment fluids with reduced frictional loss characteristics can be formed and the friction reducing agents will reduce the pumping equipment and power required to treat a formation and in other cases the friction reducing agents will enable a higher flow rate of fracturing fluid to be used to treat the formation;

the methods of the present disclosure may provide reduced damage to well formations via the use of non-aqueous fracturing fluids; and additionally, initial disposition of the polysiloxane in an emulsion renders it readily pumpable with low flammability and toxicity.

Other objects and aspect of the present invention will become apparent to one of ordinary skill in the art upon review of the specification, drawings and claims appended hereto.

SUMMARY OF THE INVENTION

In accordance with one aspect of the invention, a fracturing fluid composition is provided. The composition includes: (i) liquid carbon dioxide ($LCO_2$) in a quantity of at least 80 wt % of the fluid composition in combination with (ii) at least one friction-reducing polymer having a molecular weight greater than 500,000 g/mol and a kinematic viscosity greater than 10,000,000 cSt in a quantity of 0.001-1.0 wt % of the fluid composition, and (iii) at least one co-solvent in an amount of 0.1-19 wt % of the fluid composition, wherein said friction reducing polymer is made at least partially soluble in said $LCO_2$ through the at least one co-solvent, and wherein the friction reducing polymer is initially disposed as an emulsion prior to addition to the fracturing fluid.

In another aspect of the invention, system for fracturing a well utilizing a fracturing fluid composition is provided. The system includes:

providing a storage tank holding the liquid carbon dioxide at a pressure range of about 150 to 400 psig and a temperature of −40 to +20° F.;

providing a fracturing pump in fluid communication with the storage tank disposed downstream thereof, wherein the fracturing pump raises the pressure of the $LCO_2$ to a pressure in the range of 2,000 to 10,000 psig;

providing a well head in fluid communication with the fracturing pump to receive the fracturing fluid composition during a fracturing operation; and providing an injection point downstream of the fracturing pump for injecting at least one friction-reducing polymer having a molecular weight greater than 500,000 g/mol and a kinematic viscosity greater than 10,000,000 cSt in a quantity of 0.001-1.0 wt % wherein the polymer is disposed in an emulsion.

DETAILED DESCRIPTION OF THE INVENTION

Figure 1:
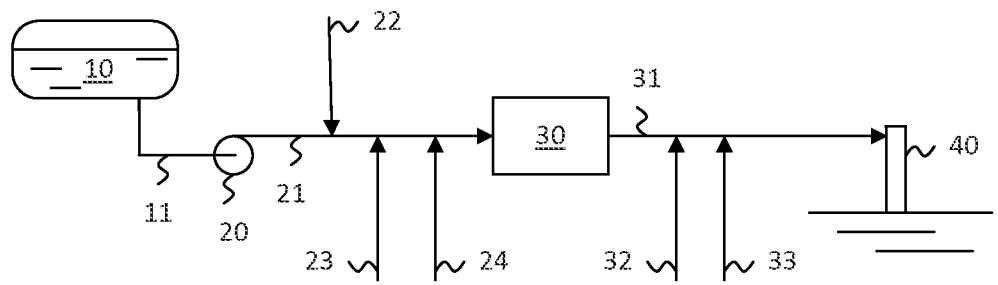
FIG. 1 is a schematic of an exemplary embodiment of the system utilized in the present invention.

The present invention involves a method for the dissolution of relatively low concentrations (approximately 0.001 to 1.0 weight percent) of high molecular weight polymers into liquid carbon dioxide ($LCO_2$) to act as friction reducers in order to save pumping power at a given fracture fluid flow rate, or to enable use of a fracture fluid flow rate that would be otherwise impossible using only $LCO_2$ due to an excessively high pressure drop. Much work has been conducted investigating the solubility of long chain, high molecular weight polymers in high pressure $LCO_2$ and supercritical $CO_2$ in order to increase viscosity, primarily for improved utilization of the $CO_2$ in Enhanced Oil Recovery (EOR) processes. However, the general conclusion has been made that high molecular weight polymers are either insufficiently soluble, or lacking in their ability to effectively thicken the $CO_2$ when in solution.

Liquid $CO_2$ is a non-polar compound and generally a poor solvent. Short chain, low molecular weight compounds tend to be more soluble in $LCO_2$ than long chain, high molecular weight compounds. Many light hydrocarbons, for example, alcohols, paraffins, and ketones are miscible with $LCO_2$, whereas many polymers are only sparingly soluble, or substantially insoluble. In some cases, low molecular weight compounds can be used as co-solvents for high molecular weight polymer in order to enable or increase the solubility of the polymer in the $LCO_2$.

The components of the present composition can be selected from among the following:

Friction Reducers

The friction reducers are polysiloxane polymers capable of reducing frictional pressure losses in a non-aqueous carrier fluid, and capable of dissolving in $LCO_2$ through the use of a co-solvent. Examples of suitable polysiloxane friction reducing polymers according to the present disclosure include those having a weight average molecular weight greater than approximately 500,000 g/mol, a kinematic viscosity greater than 10,000,000 cSt at 77° F., and those being terminated by hydroxyl, trimethylsiloxy, and vinyl groups.

The friction reducer polymer can be prepared by polymerization using any suitable techniques known in the art. In one embodiment, the resulting polymers can have weight average molecular weights of greater than 500,000 g/mol as determined by gel permeation chromatography (GPC) for example, and a kinematic viscosity greater than 10,000,000 cSt, measured at 77° F. Examples of suitable commercially available polysiloxanes include high molecular weight linear polysiloxanes manufactured or distributed by Dow Corning, Wacker, Shinetsu, Gelest, Clearco.

As mentioned above, the high molecular weight polysiloxanes range from viscous liquids to rubbery materials depending on their molecular weight. The polysiloxane friction reducing polymer is disposed as an emulsion, which allows the polymer to be pumped by conventional equipment. In one embodiment, the emulsion comprises polysiloxane particles, having a mean diameter less than 0.6 microns, dispersed in water, and stabilized by a suitable surfactant, such that the polymer concentration is approximately 60 weight percent of the emulsion composition. U.S. Pat. No. 6,013,682 to Dalle et al., describes a method of making silicone in water emulsions that might be used as a feedstock of the present invention. Friction reducing polysiloxane polymer concentrations can range, for example, from about 0.001 to 1.0 weight percent based on the weight of the total fracturing fluid. Ratios and concentrations outside of these ranges can also be employed as needed depending on the fracturing needs of the individual well.

Co-Solvent

A co-solvent is employed to aid dissolution of the friction reducing polysiloxane polymer in $LCO_2$, and is one that is soluble in $LCO_2$. Examples of suitable co-solvents include:

condensate, diluent, toluene, liquefied petroleum gas, propane, butane, pentane, hexane, heptane, naphtha, kerosene, acetone, tetrahydrofuran, silicone oil, linear, branched or cyclic forms of the aforementioned compounds or mixtures thereof. Condensate is a term used to describe light hydrocarbons, such as ethane, propane, butane etc., separated from natural gas. Diluent is a term used to describe a mixture of light hydrocarbons added to bitumen and other high viscosity fluids to make them more flowable. Naphtha is a general term for a mixture of hydrocarbons usually having between five (5) and twelve (12) carbon atoms per molecule. Kerosene is a petroleum distillate comprising a mixture of hydrocarbons usually having between six (6) and sixteen (16) carbon atoms per molecule. Preferred co-solvents are soluble in $LCO_2$, and have a closed cup flash point greater than 140° F. Examples of preferred co-solvents include: methyl oleate, soy methyl ester, diethylene glycol dimethyl ether, tetraethylene glycol dimethyl ether, diethylene glycol butyl ether acetate and dipropylene glycol methyl ether acetate or mixtures thereof. Additional co-solvent includes the Elevance Clean 1200 by Elevance Renewable Services and STEPOSOL® MET-10U by Stepan Company. The low flammability associated with a high flash point is of significant advantage in the safe design and operation of this type of equipment. In particular, soy methyl ester is preferred because it has a closed cup flash point of approximately 320° F., depending on the source, and is relatively cheap. Various other fatty acid esters may be used as desired, or mixtures thereof. These may be sold as solvents under various trade names or even as B100 biodiesel when originally intended for use a fuel ingredient.

Co-solvent concentrations can range, for example, from about 0.1 to 19 weight percent based on the total weight of the fracturing fluid. Ratios and concentrations outside of these ranges can also be employed as required.

$LCO_2$

The $CO_2$ usable for fracturing a formation is usually in liquid form, usually having a pressure in the range 2,000 to 10,000 psig, and temperature below 88° F. It is possible that at some point after the high pressure fracture pumps, that the temperature of the $CO_2$ will rise above 88° F., and the pressure will be above 1056 psig causing the $CO_2$ to exist in a supercritical state. The $CO_2$ is intended to be dry/non-aqueous and containing 5 percent water by weight or less, based on the total weight of the carrier fluid. In some cases embodiments, the fracturing fluid can contain 1 percent by weight water or less, or substantially no water.

Surfactants

In addition to the ingredients discussed above, the fracturing fluid can optionally include a surfactant. Any suitable surfactant that is soluble in a $LCO_2$ fracturing fluid can be employed. In some embodiments, the fracturing fluid does not include surfactant agents.

Viscosity Modifying Agents

Another optional additive that may be employed for fracturing fluids includes a viscosity modifying agent. Any viscosity modifying agent suitable for adjusting the viscosity of $LCO_2$, such as fumed silica, can potentially be used. In some embodiments, the fracturing fluid does not include viscosity modifying agents.

Proppants

Proppants can be mixed with the fracturing fluids of the present application. Any suitable proppant can be employed. Proppants are generally well known for use in fracturing fluids. Examples of suitable proppant include graded sand, glass or ceramic beads or particles, bauxite grains, resin coated sand, walnut shell fragments, and combinations of the above.

Proppants are well known to be used in concentrations ranging from about 0.05 to about 14 pounds per gallon of fracturing fluid, but higher or lower concentrations can be used as desired for the particular fracture design.

One exemplary embodiment of the present invention is directed to a composition of a fracturing fluid for treating a formation. The fluid composition is formulated with the following components: liquid carbon dioxide ($LCO_2$) together with at least one friction reducing polymer that is a polysiloxane initially disposed in an emulsion, and at least one co-solvent utilized to enable dissolution of the polysiloxane friction reducer in $LCO_2$, and enable its friction reducing function. The polysiloxane may be any member of the polysiloxane family that is soluble in $LCO_2$, usually through use of a co-solvent, and that is of sufficient molecular weight that it shows a propensity to significantly reduce frictional losses in flowing $LCO_2$. The polysiloxane is preferably polydimethylsiloxane (PDMS) that is either terminated with hydroxy, trimethylsiloxy, or vinyl groups for instance, depending on the manufacturer's synthesis method. Other termination groups are possible. The polysiloxane should have a weight average molecular weight greater than about 500,000 g/mol and kinematic viscosity greater than 10,000,000 cSt, measured at 77° F. The at least one co-solvent may be any co-solvent or mixture of co-solvents, that enhances or enables the dissolution of the polysiloxane in $LCO_2$, and is commonly an organic solvent or petroleum distillate. Such a co-solvent can be selected from among: condensate, diluent, toluene, liquefied petroleum gas, propane, butane, pentane, hexane, cyclohexane, heptane, naphtha, kerosene, acetone, tetrahydrofuran, silicone oil, linear, branched or cyclic forms of the aforementioned compounds, methyl oleate, soy methyl ester, diethylene glycol dimethyl ether, tetraethylene glycol dimethyl ether, diethylene glycol butyl ether acetate and dipropylene glycol methyl ether acetate or mixtures thereof Preferred co-solvents, have a relatively high boiling point and in particular a relatively high flash point, to minimize flammability risk. Preferred co-solvents are also those which promote good solvation of the polysiloxane in the fracturing fluid as evidenced by higher friction reduction results at lower concentrations, and have the following desirable properties: low cost, low human and environmental toxicity, ready biodegradability; are non-damaging to the well formation and compatible with downstream natural gas/oil transport, processing, and refining operations. Suitable second co-solvents are sometimes found to be poor solvents for the polysiloxane polymer by themselves but when used in combination with the $LCO_2$ found to be good co-solvents for the polysiloxane in $LCO_2$.

The preferred co-solvent is selected from one of the following:

A fatty acid monoalkyl ester. These materials include saturated and unsaturated esters of between about 8 and about 24 carbon units per chain which are typically obtained from triglycerides of plant or animal origin by means of transesterification with $C_1$-$C_4$ monohydric alcohols. Examples include mixed and pure fatty acid esters such as isopropyl myristate, isopropyl laurate, methyl oleate, and fatty acid methyl esters derived from the methanolysis of soy, corn, canola, coconut and palm oils, beef tallow, yellow grease, used cooking oils and the like, which are commonly sold as biodiesel fuel. Preferred materials of this class are liquid esters having an advantageously low melting point and high flash point such as methyl oleate and soybean oil biodiesel.

An alkylene glycol derivative. Suitable materials are derivatives of linear diols containing from one to about four ethylene oxide and/or propylene oxide units, that may be independently terminated by either a $C_1$-$C_6$ alkyl or aryl ether or a $C_2$ to $C_4$ carboxylic acid ester. Materials included in this category have the general structure below:

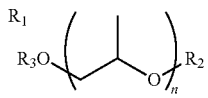

n=1 to 4
$R_1$=H or $CH_3$
$R_2$+$R_3$=H or $C_1$-$C_6$ Alkyl or Aryl or $C_2$-$C_4$ Acyl Examples of this class include unsubstituted glycols such as tetraethylene glycol; glycol monoethers such as propylene glycol phenyl ether (DOWANOL PPH); glycol diethers such as triethylene glycol dimethyl ether ("diglyme") and tetraethylene glycol dimethyl ether ("tetraglyme"); glycol monoalkyl ether esters such as diethylene glycol butyl ether acetate (EASTMAN DB ACETATE) and dipropylene glycol methyl ether acetate (DOWANOL DPMA); and glycol diesters such as propylene glycol diacetate (DOWANOL PGDA). Preferred materials of this class will have at least one terminal ether or ester substitution. Examples of preferred materials are tetraethylene glycol dimethyl ether and diethylene glycol monobutyl ether acetate.

A $C_8$-$C_{18}$ aliphatic alcohol or the ester of these with a $C_2$-$C_4$ carboxylic acid. Examples of materials of this class include 2-ethylhexanol, lauryl alcohol, hexadecanol and 2-ethylhexyl acetate.

Polydimethylsiloxane is also commonly known as "PDMS", dimethylpolysiloxane, dimethyl silicone oils, and dimethicone. Polysiloxanes is a general term for compounds like polydimethylsiloxane that are based on a Si—O repeating unit backbone, and can be referred to as silicone oil, liquid silicone, silicone liquid, 100% silicones, can more generally be employed. In addition the polydimethylsiloxane, or more generally, the polysiloxane, may contain a minor quantity of a copolymer, and still be termed polydimethyl siloxane or polysiloxane. Polysiloxanes is a common term used in marketing and selling these compounds.

The concentration of the at least one friction reducer in the fracture fluid is preferably in a range of between 0.001 and 1.0 weight percent (10 to 10,000 wppm) in order to provide sufficient friction reduction in the $LCO_2$ fracturing operations. The concentration of the co-solvent is preferably in the range of between 0.1 and 19 weight percent. The composition of the fracturing fluid often also includes a proppant.

Another aspect of the present disclosure is directed to the method or fracturing or treating a formation using the friction reducing agents. The method includes providing the friction reducing fluid as described above, formulated with the following components: $LCO_2$, at least one friction reducer that is a polysiloxane, a co-solvent selected from the group of: condensate, diluent, toluene, liquefied petroleum gas, propane, butane, pentane, hexane, cyclohexane, heptane, naphtha, kerosene, acetone, tetrahydrofuran, silicone oil, linear, branched or cyclic forms of the aforementioned compounds, fatty acid monoalkyl esters, such as methyl oleate and soy methyl ester, alkylene glycol derivatives such as tetraethylene glycol dimethyl ether or diethylene glycol butyl ether acetate $C_8$-$C_{18}$ aliphatic alcohols and esters of these. In order to maximize effectiveness, the co-solvent should be soluble in the $CO_2$ over the range of temperatures and pressures observed in the fracturing operation, and in turn, the friction reducing polysiloxane polymer should be at least partially soluble in the resultant $CO_2$ and co-solvent mixture.

The temperature of the $CO_2$ will normally be below ambient temperature immediately after the fracturing pumps, and in cases may warm to above its critical temperature of approximately 88° F. as it passes through the well-bore and into the formation, causing the $CO_2$ to be in its supercritical state. The pressure of the $CO_2$ will normally be in the range 2,000 to 10,000 psig. The $CO_2$, co-solvents and polysiloxane, should preferably be able to form a single phase solution over these ranges of temperature and pressures.

The preferred polysiloxane polymers of the present invention are only made soluble in $LCO_2$, in sufficient concentration to be effective as friction reducers, through the use of a suitable co-solvent. Further, these polymers tend to be highly viscous liquids or rubber-like solids that are hard to flow. Therefore, the polysiloxane polymer is disposed as an emulsion in order to make the polysiloxane more flowable, that is to render it in a form having lower viscosity, making it pumpable by conventional fluid pumping equipment. The solubility of the polysiloxane in the $LCO_2$, aided by co-solvent, increases with increasing $LCO_2$ pressure, and is it is preferred to add the polysiloxane emulsion, into the $LCO_2$ on the high pressure side of the fracturing pumps, where pressures will normally be in the range 2,000 to 10,000 psig, instead of on the low pressure side of the fracturing pumps where pressures will normally be in the range 150 to 400 psig. Additionally, it is preferred to add the polysiloxane emulsion into a flowing stream of $LCO_2$ and co-solvent where the shear rate is such that the components are effectively dispersed in one another and able to dissolve the polysiloxane in a relatively short amount of time. In particular, if the shear rate is insufficient, the polymer particles in the emulsion can coalesce and separate into large, discrete entities, that present a relatively low surface area to the co-solvent and $LCO_2$ phase and that will take an inordinately long amount of time to dissolve in order to become effective as a friction reducer.

In most cases, the polysiloxane polymer, made flowable via an emulsion is conveniently added to the flowing, high pressure $LCO_2$ by the use of a positive displacement pump.

Now turning to FIG. 1, an exemplary commercial embodiment of the system employed is depicted. The $LCO_2$, can be stored as a bulk refrigerated liquid in insulated storage tank(s) 10, at a pressure in the approximate range 150 to 400 psig, and with a temperature at or below its boiling point, and is typically in the range −40 to 20° F. depending on pressure. $LCO_2$ is fed to booster pump 20 via line 11, where its pressure is raised by at least about 50 psi before being fed to high pressure fracture pump(s) 30 via line 21. Booster pump 20 ensures that the pressure of $LCO_2$ passing to high pressure fracture pump(s) is sufficiently above its vapor pressure to mitigate cavitation or vapor lock in high pressure fracture pump(s) 30. High pressure fracture pump(s) 30 raise the pressure of the $LCO_2$ to a value typically in the range 2,000 to 10,000 psig, depending on the needs of the particular fracture treatment. High pressure $LCO_2$ is then fed to well head 40 via line 31. When proppant is required, it is conveniently added to $LCO_2$ stream 21 via line 22.

In this embodiment, a friction reducing polymer, such as PDMS having a kinematic viscosity of greater than 120,000,000 cSt, disposed in an emulsion, is added to $LCO_2$ stream 31 on the high pressure side of fracture pumps 30, via line 33 by a suitable means such as a high pressure positive displacement metering pump. A co-solvent, such as soy methyl ester, is added to $LCO_2$ stream 31 via line 32 at distance sufficiently upstream of line 33 so that the co-solvent is well mixed in the $LCO_2$ prior to addition of the friction reducing polymer emulsion. Thereafter, when the polymer emulsion is added, there is co-solvent present in the $LCO_2$ for the polymer to dissolve and become effective as a friction reducer. When the polymer emulsion is added, the polymer particles become dispersed in the $LCO_2$ and co-solvent stream through turbulent mixing, and start to dissolve in the $LCO_2$ and co-solvent stream. It can take several seconds or more for this dispersion and dissolution process to complete enough for the dissolved polymer to become effective as a friction reducer. A portion of this process conveniently takes place in line 31 that connects the high pressure fracture pump(s) to the well-head while another portion may take place in the well-bore, or tubing placed therein if necessary. Although not shown, line 31 will typically include a high pressure manifold into which the high pressure fracture pumps are fed, as well as a section of high pressure iron (piping) to connect the manifold to the well head. The co-solvent and polymer emulsion, may be fed via lines 32 and 33 respectively into the manifold, or into the high pressure iron via injection tees, or into and additional mixing device disposed in line 31 designed to rapidly mix the LCO, co-solvent and polymer emulsion together. The mixing device may contain physical means or have multiple ports for addition of $LCO_2$, co-solvent and polymer emulsion for example, in order to enhance the mixing and dissolution process. The high pressure manifold typically has a 6-inch nominal diameter and the high pressure iron, 4-inch, whereas the wellbore may contain tubing having 2 and ⅞ inch or 2 and ⅜ inch nominal diameter for example. As will be appreciated the velocities in the manifold and iron will be lower than in the well bore tubing, and therefore the frictional pressure losses will be lower, and the residence times higher in a given length of conduit. It is therefore desirable to have the polymer disperse and dissolve to the fullest extent possible in these surface conduits, so that it may act as a friction reducer as soon as possible when it enters in the well bore tubing.

Other embodiments are contemplated such as with the addition of co-solvent to the $LCO_2$ in storage tank(s) 10, giving the advantage of being pumped with the $LCO_2$ by booster pump 20. Co-solvent may also be conveniently added to the $LCO_2$ via line 23 prior to the high pressure frac pumps, since it is usually also soluble in the $LCO_2$ at relatively low pressures. Additionally, friction reducing polymer emulsion may be added to $LCO_2$ stream 21 on the low pressure side of fracture pump(s) 30 via line 24. The friction reducing polymer will not substantially dissolve in the $LCO_2$ at low pressure, but when injected here is will tend to be well dispersed in the $LCO_2$ under the high shear conditions, rapidly pass through frac pump(s) 30, whereupon the pressure will be raised sufficiently high to enable dissolution of the polymer and its effectiveness as a friction reducer. The present invention will be further described with respect to the following examples, which are not to be construed as limiting the invention, but rather to further illustrate the various embodiments.

EXAMPLES

Figure 2:
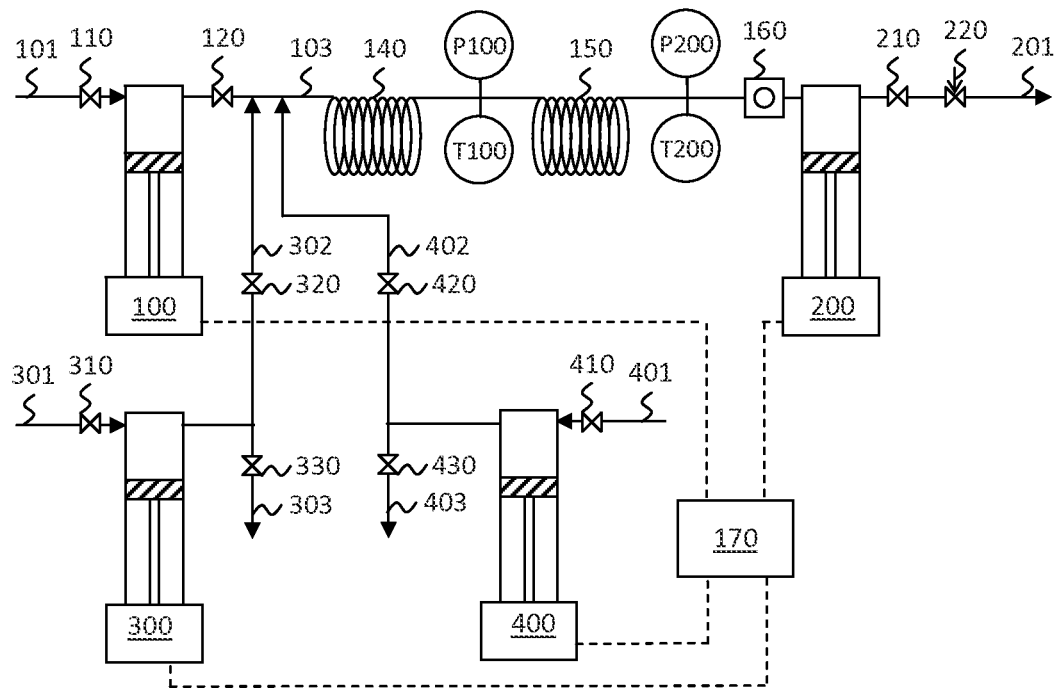
FIG. 2 is a schematic of the experimental apparatus employed to in the experimental runs and illustrated in connection with the examples.

The experimental apparatus, as shown in FIG. 2, includes two Teledyne Isco model 500 HP syringe pumps, 100 and 200, connected in fluid communication via a flow path containing a coiled, six foot length of one-sixteenth inch stainless steel tubing 150, having an internal diameter of 0.0225 inches. Coil 150 was preceded by another coiled length of tubing 140, having variable diameter and length. The coiled section 150 was designed to impart significant pressure drop on the flowing fluid in order to characterize frictional pressure losses, while coiled section 140 was intended to pre-mix feed components and permit dissolution of polymer into the bulk liquid. A view-cell 160 was also inserted after coil 150 to enable visual inspection of the fluid if desired. Pump 100 was used to pump $LCO_2$ at predetermined flow rates into the apparatus. Pump 200 was used to receive the $LCO_2$, and additives, and was used to control the downstream pressure at a predetermine value.

A third Teledyne ISCO model 500 HP syringe pump, 300 was connected upstream of mixing coil 140 and utilized to inject co-solvent into the $LCO_2$ flowing from pump 100, whilst a Teledyne ISCO model 100DM syringe pump 400 was connected after this point, but still before the mixing coil 140, and utilized to inject polymer emulsion into the $LCO_2$ and co-solvent mixture. All four pumps were controlled via Teledyne Isco control box 170.

Each experiment utilized a PDMS polymer in water emulsion, wherein the polymer (internal phase of the emulsion) had viscosity greater than 120,000,000 cSt, and an mean particle size of less than 0.6 microns and comprised approximately 60 wt % of the emulsion. Each experiment utilized a B100 biodiesel co-solvent, derived from 100% soybean oil, supplied by VHG Labs Inc. of Manchester, N.H. This B100 biodiesel co-solvent was chosen, as a convenient source of soy methyl esters, and it is expected that the same, or very similar results, would be obtained with other sources of soy methyl ester.

Each experimental run was prepared by drawing in liquid $CO_2$, co-solvent and polymer emulsion into pumps 100, 300 and 400 respectively via lines 101, 301 and 401 shown in FIG. 2. Once sufficient volume of each liquid to perform a run had been loaded into each pump, inlet valves 110, 310 and 410 were closed, and the pressure of the fluid in each pump was raised to 3,000 psig. Thereafter, the output lines from pumps 300 and 400 were primed via valves 303 and 403 to remove any vapor. The lines, coils 140 and 150 and view cell 160 between pumps 100 and 200 were similarly purged of vapor by flowing liquid $CO_2$ through them.

To measure frictional loss characteristics, experimental mixtures were made by setting the flow rate ratios of each component via pumps 100, 200 and 300, and setting the total flow rate to be 150 ml/min. A flow rate of 150 ml/min through the $\frac{1}{16}^{th}$ inch coil 150, was sufficient to generate a Reynolds number of approximately 50,000 in each experimental run, which is sufficiently in the turbulent flow regime to observe friction reduction effects through the presence of high molecular weight polymer. The pressure from each run was controlled through pump 200 which received the experimental mixture from coil 150. During each run, the pressure drop across the length of coil 150 was measured via pressure transducers P100 and P200, and the temperature was recorded via thermocouples T100 and T200. Each run was carried out at a downstream pressure of 3,000 psig and a temperature of approximately 60° F. At the end of each experiment, the experimental mixture was vented from the system via line 201.

Example 1

Figure 3:
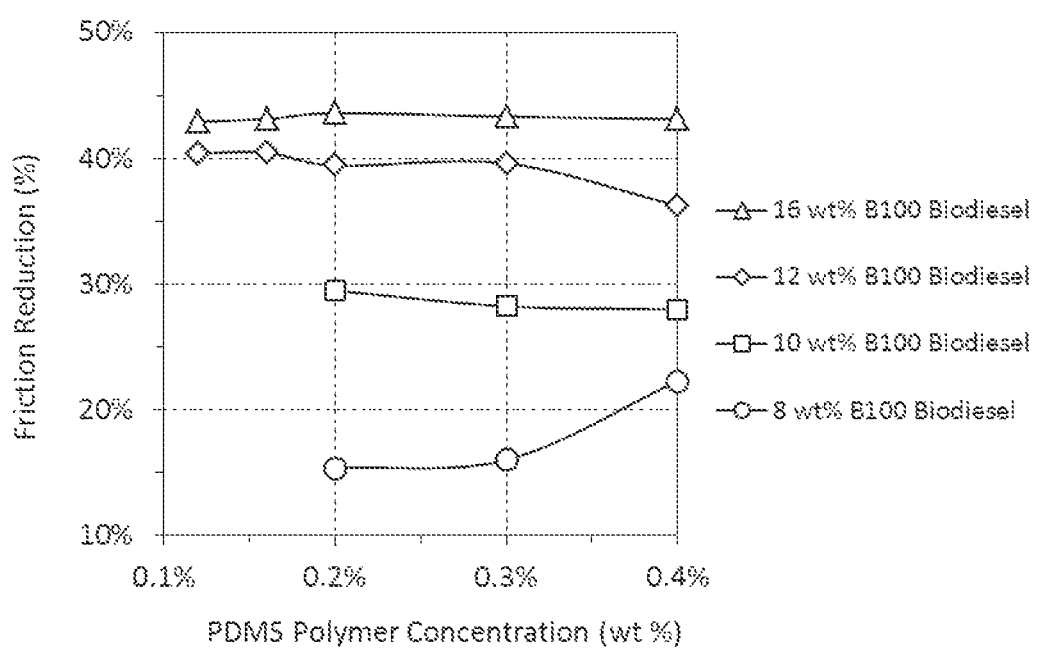
FIG. 3 is a plot of the results obtained from multiple experimental runs characterizing friction reduction in a fracturing fluid comprising PDMS polymer (having a kinematic viscosity greater than 120,000,000 cSt), a soy methyl ester co-solvent and $LCO_2$.

FIG. 3 provides friction reduction results at the flow rate of 150 ml/min (corresponding to a mean linear velocity in coil 150 of approximately 32 ft/sec) for several experimental compositions, utilizing a mixing coil (140) comprising a 16 ft length of 0.027-inch internal diameter tubing. This was sufficient to premix the liquid $CO_2$, co-solvent and polymer emulsion for 0.72 seconds prior to entering friction coil 150. Friction reduction results are shown for increasing concentrations of polymer in the range 0.12 to 0.40 wt %, as a function of four different concentration levels of co-solvent, of 8, 10, 12 and 16 wt %. The balance of the experimental composition was $LCO_2$ plus the remainder of the emulsion that was mostly water and stabilizing surfactant. Since the polymer emulsion comprised approximately 60 wt % polymer, the amount of water and stabilizing surfactant was relatively small, and less than the concentration of the polymer. Note, in these experiments, friction reduction is approximated as the percent reduction in pressure drop of an experimental mixture compared to the pressure drop of pure liquid $CO_2$, ignoring the small density difference of the experimental fluid vs liquid $CO_2$, that would be included in the more rigorous calculation of friction reduction through percent reduction in Fanning friction factor.

Referring to FIG. 3, it can be seen that friction reduction increases with increasing amount of B100 biodiesel co-solvent, in the range 8 to 16 wt %. This is likely due to the co-solvent (i) increasing the rate at which polymer is dissolved in the experimental composition, and (ii) allowing the polymer to be better solvated and provide a stronger friction reduction effect. It can also be seen that the friction reduction effect is relatively flat with respect to polymer concentration in the range 0.12 to 0.40 wt %. This is likely due to sufficient polymer being dissolved at the lowest feed concentrations, with additional polymer providing no further benefit. It should be noted that some undissolved polymer was noticed coming out of view-cell 160 in all experiments, indicating the combined action of the mixing coil and friction coil was insufficient to dissolve all of the polymer. In commercial application it is expected that a higher proportion, if not all of the polymer will be dissolved as it passes through the wellbore over a longer period of time. Further it is also anticipated that a portion of the dissolve polymer will undergo scission through the well bore and become ineffective, therefore it is anticipated that an excess of polymer may be required in order to compensate. B100 biodiesel, and soy methyl ester, is more expensive than liquid $CO_2$, and similarly the PDMS polymer emulsion is relatively expensive, so for these and other considerations, it is preferred to use the minimum amount of each that will still give a high level of friction reduction. From FIG. 3, an example of suitable composition is 0.2 wt % PDMS polymer, 12 wt % B100 biodiesel co-solvent, balance $LCO_2$ and the balance of the emulsion.

Example 2

In a second set of experiments, this same composition was used, and premixing coil 140 varied to examine the effect of premixing in friction reduction. Table 1 shows the different premixing coils used and the resultant friction reduction obtained for each test. In one test no premixing coil was used; in a second test an identical coil to the friction coil was used, that is a 6 ft length of 0.023 inch internal diameter (ID) tube; the third test utilized the same coil as used in example 1, that is a 16 ft length of 0.027 inch ID tube; and a fourth coil utilized a 12 ft length of 0.069 inch ID tube disposed between two 0.027 in ID connecting sections. As can be seen in table 1, increasing residence time in the mixing tube appears to increase the friction reduction seen in the friction coil from a minimum of 34% with no coil to a maximum of 41% with the 12 ft length of 0.069 inch ID coil. However, as will be appreciated, different levels of shear will be experienced in each of the different diameter coils, and this as well as residence time will likely effect the polymer mixing and dissolution kinetics. Referring to FIG. 1, in commercial application it is possible to achieve a degree of premixing in line 31 between the addition points of lines 32 and 33 and the well 40. This section of line may for instance include approximately 100 ft of four inch nominal diameter surface iron, which may be sufficient to give several seconds of premixing depending of the exact dimensions and flow rates being used. As can be appreciated, additional mixing devices may also be inserted in that line to aid mixing and dissolution.

TABLE 1

| Friction Reduction Achieved as a Function of Premixing Coil | | | | | | |
|---|---|---|---|---|---|---|
| Premixing Coil | Internal Diameter (inches) | Flow Length (feet) | Residence Rate (ml/min) | Mean Time (sec) | Velocity (fps) | Friction Reduction (%) |
| No Coil | — | — | 150 | — | — | 34% |
| Coil 1 | 0.023 | 6 | 150 | 0.19 | 32 | 37% |
| Coil 2 | 0.027 | 16 | 150 | 0.72 | 22 | 39% |
| Coil 3 | 0.069 | 12 | 150 | 3.5 | 3.4 | 41% |

Although various embodiments have been shown and described, the present disclosure is not so limited and will be understood to include all such modifications and variations as would be apparent to one skilled in the art.

We claim:

1. A method of making a fracturing fluid, comprising: (i) providing liquid carbon dioxide ($LCO_2$) in a quantity of at least 80 wt % of the fracturing fluid from a storage tank and routing it through a fracturing pump disposed in a main conduit; (ii) adding a co-solvent in a quantity of 1-19 wt % of the fracturing fluid composition downstream of the fracturing pump; and (iii) adding at least one friction-reducing polymer having a kinematic viscosity greater than 10,000,000 cSt in a quantity of 0.001-1.0 wt % of the fracturing fluid composition downstream of the fracturing pump, wherein said friction-reducing polymer is initially disposed in an emulsion, and is at least partially soluble in the co-solvent and $LCO_2$ mixture.

2. The method of claim 1, wherein the fracturing fluid is passed through a mixing device disposed in the main conduit in order to at least partially dissolve the friction-reducing polymer.

3. The method of claim 1 wherein the polymer is initially disposed in an aqueous emulsion.

4. The method of claim 1, further comprising: adding proppant to the LCO2 in the main conduit of step (i).

5. The method of claim 1, wherein said friction reducing polymer is a polysiloxane.

6. The method of claim 5, wherein the polysiloxane is a polydimethylsiloxane having hydroxyl, trimethylsiloxy or vinyl terminal groups.

7. The method of claim 1, wherein said co-solvent is a hydrocarbon, an oxy-hydrocarbon or a siloxane, or mixtures thereof.

8. The method of claim 7, wherein the co-solvent is selected from the group consisting of condensate, diluent, toluene, liquefied petroleum gas, propane, butane, pentane, hexane, heptane, naphtha, kerosene, acetone, tetrahydrofuran, silicone oil, linear, branched or cyclic forms of the aforementioned compounds, and mixtures thereof.

9. The method of claim 7, wherein the co-solvent has a closed cup flash point greater than 140° F., and is selected from one of the following:
   i: A C1-C4 monoalkyl ester of a C8 to C24 fatty carboxylic acid derived from a plant or animal triglyceride,
   ii: An alkylene glycol derivative of the general structure:

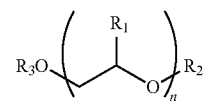

-continued n = 1 to 4
$R_1$ = H or $CH_3$
$R_2 + R_3$ = H or $C_1$ - $C_6$ Alkyl or Aryl or $C_2$ - $C_4$ Acyl iii A C8-C18 aliphatic alcohol or the ester of these with a C2-C4 carboxylic acid.

10. The method of claim 9, wherein the co-solvent is selected from the group consisting of methyl oleate, soy methyl ester, triethylene glycol dimethyl ether, tetraethylene glycol dimethyl ether, diethylene glycol butyl ether acetate, dipropylene glycol methyl ether acetate, and mixtures thereof.

11. A method of making a fracturing fluid, comprising: (i) providing a liquid carbon dioxide ($LCO_2$) in a quantity of at least 80 wt % of the fracturing fluid from a storage tank and routing it through a fracturing pump disposed in a main conduit; (ii) adding a co-solvent in a quantity of 1-19 wt % of the fracturing fluid composition upstream of the fracturing pump; and (iii) adding at least one friction reducing polymer having a kinematic viscosity greater than 10,000,000 cSt in a quantity of 0.001-1.0 wt % of the fracturing fluid composition downstream of co-solvent addition point, wherein said friction reducing polymer is initially disposed as an emulsion, and is at least partially soluble in the co-solvent and $LCO_2$ mixture.

12. The method of claim 11, wherein the fracturing fluid is passed through a mixing device disposed in the main conduit in order to at least partially dissolve the friction-reducing polymer.

13. A system for fracturing a well utilizing a fracturing fluid composition, comprising:
    (a) providing at least one storage tank holding a liquid carbon dioxide ($LCO_2$) at a pressure range of about 150 to 400 psig and a temperature of about −40 to +20° F.;
    (b) providing at least one fracturing pump in fluid communication with the at least one storage tank disposed downstream thereof, wherein the fracturing pump raises the pressure of the liquid carbon dioxide to a pressure in the range of 2,000 to 10,000 psig;
    (c) connecting the at least one fracturing pump to a well head in order to fluidly transmit the fracturing fluid composition downstream to the well head during a fracturing operation;
    (d) providing an injection point downstream of the at least one fracturing pump for injecting at least one co-solvent; and
    (e) providing a second injection point downstream of the at least one fracturing pump for injecting at least one friction-reducing polymer having a kinematic viscosity greater than 10,000,000 cSt, wherein said friction-reducing polymer is initially disposed as an emulsion, and is at least partially soluble in the co-solvent and $LCO_2$ mixture, to attain a fracturing fluid composition containing at least 80 wt % carbon dioxide, 0.001-1.0 wt % of said friction reducing polymer and 1-19 wt % of the at least one co-solvent.

14. The system of claim 13, further comprising at least one mixing device disposed in a main conduit after the at least one fracturing pump and after the co-solvent and friction-reducing polymer injection points.

15. The system of claim 13, wherein the friction reducing polymer is a polysiloxane.

16. The system of claim 13, further comprising at least one booster pump disposed between the at least one storage tank and the at least one fracturing pump to increase the liquid carbon dioxide pressure by about 50 psi or more.

17. The system of claim 13, further comprising an injection point upstream of the at least one fracturing pump for the addition of proppant.

18. A system for utilizing a fracturing fluid composition in an operation, comprising:
    (a) providing at least one storage tank holding a liquid carbon dioxide ($LCO_2$) at a pressure range of about 150 to 400 psig and a temperature of −40 to +20° F.;
    (b) providing at least one fracturing pump in fluid communication with the at least one storage tank disposed downstream thereof, wherein the fracturing pump raises the pressure of the liquid carbon dioxide to a pressure in the range of 2,000 to 10,000 psig;
    (c) connecting the at least one fracturing pump to a well head in order to fluidly transmit the fracturing fluid composition downstream to the well head during a fracturing operation;
    (d) providing an injection point downstream of the at least one fracturing pump for injecting at least one co-solvent; and
    (e) providing a second injection point downstream of the at least one fracturing pump for injecting at least one friction-reducing polymer having a kinematic viscosity greater than 10,000,000 cSt, wherein said friction-reducing polymer is initially disposed as an emulsion, and is at least partially soluble in the co-solvent and LCO2 mixture, to attain a fracturing fluid composition containing at least 80 wt % carbon dioxide, 0.001-1.0 wt % dissolved of said friction reducing polymer and 1-19 wt % of the at least one co-solvent.

\* \* \* \* \*